(12) United States Patent
Fukushima et al.

(10) Patent No.: US 10,150,168 B2
(45) Date of Patent: Dec. 11, 2018

(54) DRILL

(71) Applicant: HONDA MOTOR CO., LTD., Tokyo (JP)

(72) Inventors: Hiroyuki Fukushima, Tochigi-ken (JP); Akihiro Osawa, Tochigi-ken (JP); Junya Onose, Tochigi-ken (JP); Toshihiko Fukuda, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/560,201

(22) PCT Filed: Jan. 19, 2016

(86) PCT No.: PCT/JP2016/051392
§ 371 (c)(1),
(2) Date: Sep. 21, 2017

(87) PCT Pub. No.: WO2016/152213
PCT Pub. Date: Sep. 29, 2016

(65) Prior Publication Data
US 2018/0071836 A1    Mar. 15, 2018

(30) Foreign Application Priority Data

Mar. 23, 2015    (JP) .................... 2015-059408

(51) Int. Cl.
*B23B 51/02*    (2006.01)
*B23B 51/00*    (2006.01)

(52) U.S. Cl.
CPC .............. *B23B 51/02* (2013.01); *B23B 51/00* (2013.01); *B23B 2251/04* (2013.01);
(Continued)

(58) Field of Classification Search
CPC ................ B23B 51/02; B23B 2251/44; B23B 2251/443; B23B 2251/446
See application file for complete search history.

(56) References Cited

U.S. PATENT DOCUMENTS 5,486,075 A * 1/1996 Nakamura .............. B23B 51/02
                                                          408/224
6,132,149 A * 10/2000 Howarth ................. B23B 51/02
                                                          408/229
(Continued)

FOREIGN PATENT DOCUMENTS

JP      59-140119        9/1984
JP    2000263307 A *    9/2000
(Continued)

OTHER PUBLICATIONS

International Search Report, dated Feb. 16, 2016 (Feb. 16, 2016), 2 pages.

*Primary Examiner* — Daniel Howell
(74) *Attorney, Agent, or Firm* — Rankin, Hill & Clark LLP

(57) ABSTRACT

A blade section has two lands and two flutes in an alternating manner and also has a linear chisel edge. The lands are each provided with: a margin section that is continuous with a cutting blade; a clearance section that is continuous with the margin section and that has a smaller diameter than the margin section; and a pad that is continuous with the clearance section and that has the same width as the width of the margin section.

4 Claims, 5 Drawing Sheets

(52) U.S. Cl.
CPC ..... *B23B 2251/043* (2013.01); *B23B 2251/18* (2013.01); *B23B 2251/408* (2013.01); *B23B 2251/443* (2013.01)

(56) References Cited

U.S. PATENT DOCUMENTS

| | | | |
|---|---|---|---|
| 7,306,411 B2 * | 12/2007 | Mabuchi | ................. B23B 51/02 408/144 |
| 7,422,396 B2 * | 9/2008 | Takikawa | ............ B23B 51/0018 408/1 R |
| 2003/0188895 A1 | 10/2003 | Osawa et al. | |
| 2012/0121350 A1 | 5/2012 | Kitamori et al. | |
| 2012/0201619 A1 | 8/2012 | Olsson | |

FOREIGN PATENT DOCUMENTS

| | | | |
|---|---|---|---|
| JP | 2003-300110 | | 10/2003 |
| JP | 2006281407 A | * | 10/2006 |
| JP | 2007-015073 | | 1/2007 |
| JP | 2009-018384 | | 1/2009 |
| JP | 2009023055 A | * | 2/2009 |
| JP | 2012-106307 | | 6/2012 |
| JP | 2012-161912 | | 8/2012 |

\* cited by examiner

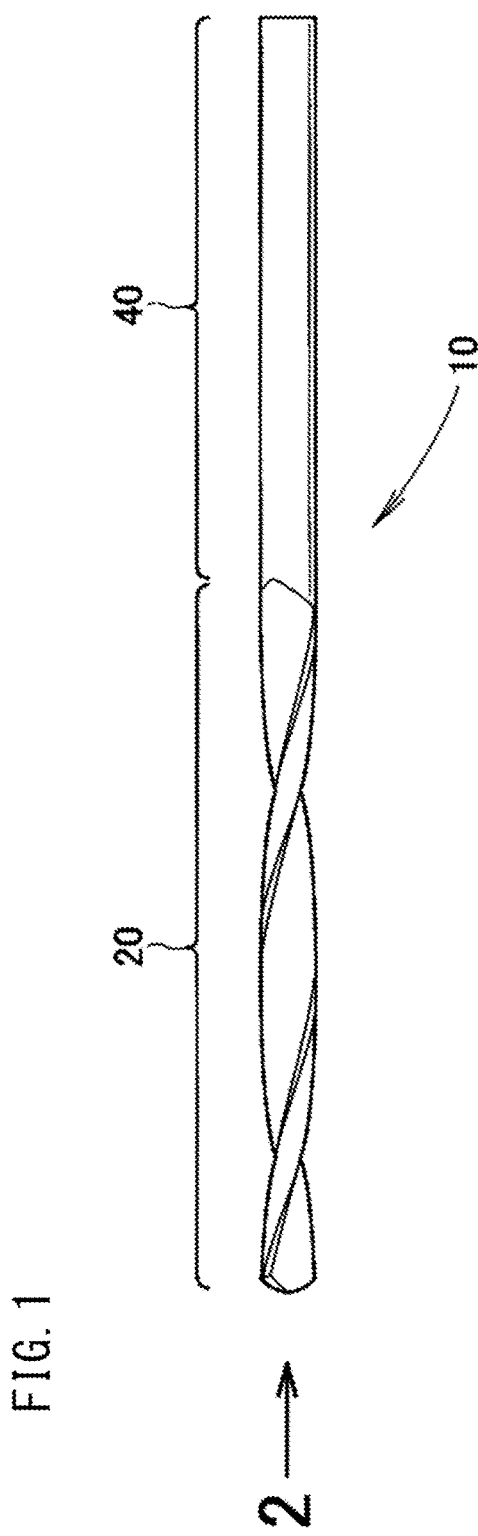

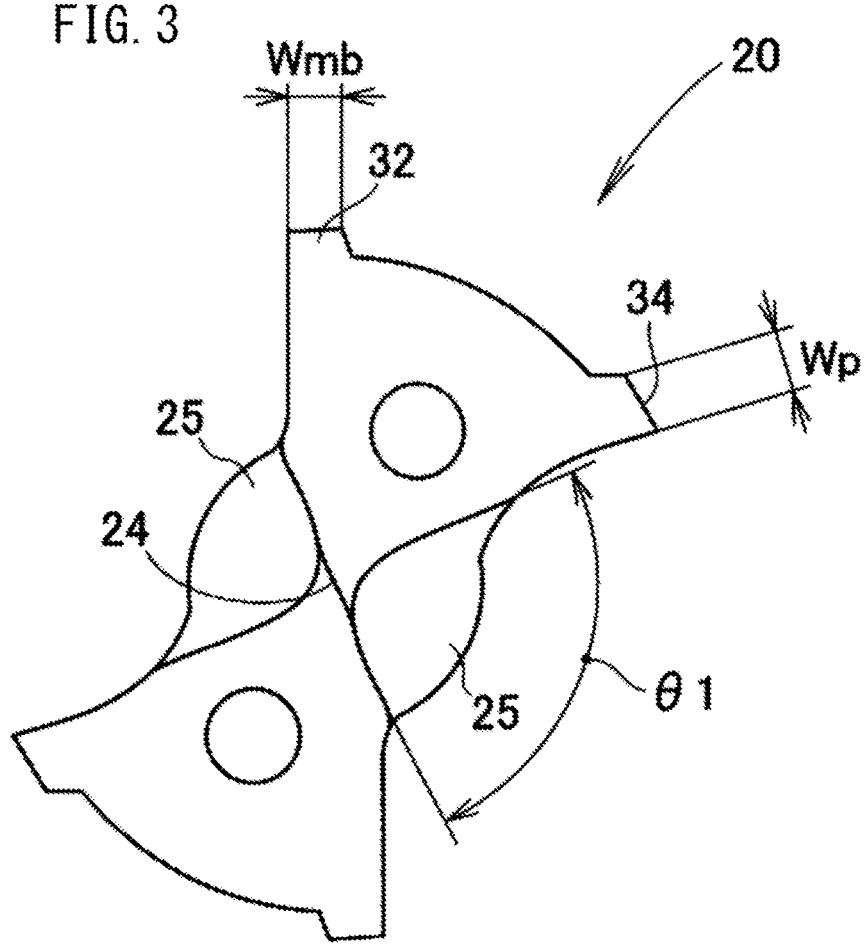

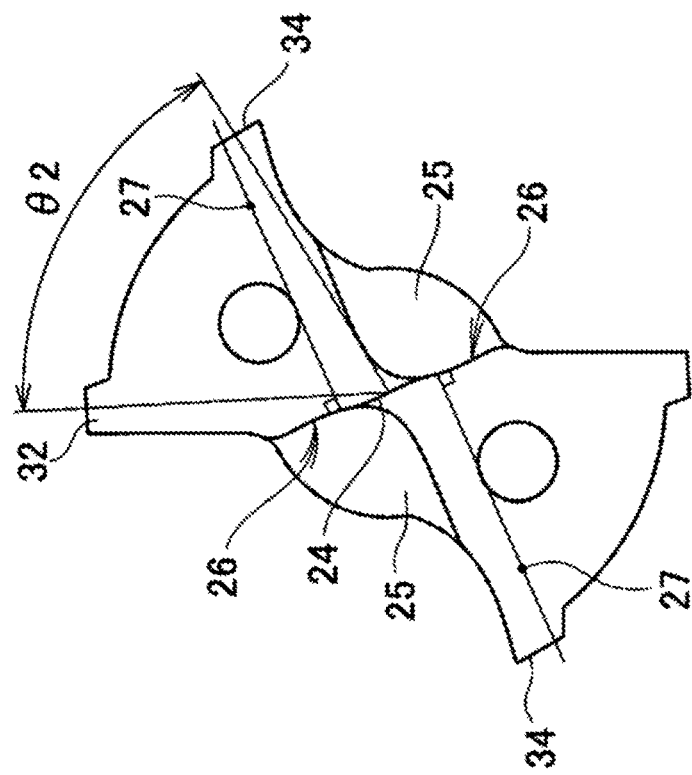
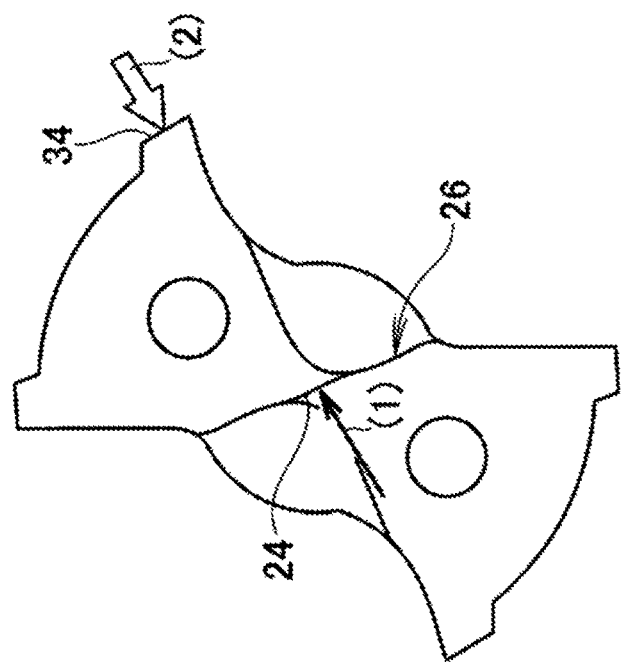
FIG. 4A
FIG. 4B

DRILL

TECHNICAL FIELD

The present invention relates to a drill suitable for machining a cast hole.

BACKGROUND ART

The cast hole is a hole formed in the casting by the pin attached to the mold. Because the cast hole is a hole as cast, it is inferior in dimensional accuracy. Therefore, it is preferable to add machining to the cast hole with a drill. The drill for this purpose is called a drill for a cast hole and various forms have been proposed (see, for example, Patent Document 1).

The drill disclosed in Patent Document 1 includes a land portion generally called a margin portion and a pad portion disposed rearward from the land portion in the rotational direction. Further, a pad portion is provided in the land portion. The pad portion can enhance the straightness of the drill.

However, it was found that chatter vibration occurred despite the addition of the pad portion. As a result, the position accuracy of the hole and the inner surface accuracy of the hole did not increase as expected.

Therefore, as a drill having a pad portion, a drill capable of further improving position accuracy of a hole and working accuracy on a surface of the hole is desired.

PRIOR ART DOCUMENT

Patent Document

Patent Document 1: Japanese Laid-Open Patent Publication No. 2009-018384

SUMMARY OF INVENTION

Technical Problem

It is an object of the present invention to provide a drill having a pad and capable of further improving position accuracy of a hole and working accuracy on a surface of the hole.

Solution to Problem

The present invention according to claim 1 is directed to a drill including a flute with a cutting edge formed at a tip end thereof and a shank continuously formed at a rear end of the flute, wherein the flute has, in a front view, two lands and two grooves alternately and a linear chisel edge, the lands each have a margin portion continuous from the cutting edge, a clearance continuous from the margin portion and having a diameter smaller than that of margin portion, and a pad continuous from the clearance and having a width same as a width of the margin portion, the pad is arranged on a line perpendicular to a thinning face.

In the invention according to claim 2, preferably, a width of the margin portion is set smaller than the width of the pad.

In the invention according to claim 3, preferably, in a side view, a clearance angle (a primary face angle) is set in a range of 6° to 8°.

In the invention according to claim 4, preferably, the pad is disposed at a position 30° to 75° rearward relative to the margin portion.

Advantageous Effects of Invention

In the invention according to claim 1, the pad is arranged on the line perpendicular to the thinning face.

The cutting resistance force applied to the thinning face is applied in a direction perpendicular to the thinning face. Chatter vibration occurs when left unattended. In the present invention, the pad is arranged on the line perpendicular to the thinning face so as to receive the cutting resistance force applied to the thinning face by the pad. As a result, chatter vibration can be suppressed.

Therefore, according to the present invention, there is provided a drill capable of improving the positional precision of the hole and the working accuracy on the surface of the hole.

In the invention according to claim 2, since the width of the margin portion is set smaller than the width of the pad, it is possible to secure a bending strength of the tool while reducing the cutting resistance in a radial direction due to the frictional resistance of the margin portion.

In the invention according to claim 3, the clearance angle is set in the range of 6° to 8° in a side view.

Since the pad exerts its effect immediately after cutting, the position accuracy of the hole and the working accuracy on the surface of the hole can be further enhanced.

In the invention according to claim 4, the pad is arranged at the position 30° to 75° rearward relative to the margin portion. The position of the land is suitable adjusted, and the position accuracy of the hole and the working accuracy on the surface of the hole can be further enhanced.

BRIEF DESCRIPTION OF DRAWINGS

FIG. 1 is a side view of a drill according to the present invention;

FIG. 2 is a view from "2" in FIG. 1.

FIG. 3 is a view illustrative of widths of a margin portion and a pad;

FIGS. 4A and 4B are views illustrative of a position of the pad; and

DESCRIPTION OF EMBODIMENTS

Embodiments of the present invention will be described below with reference to the accompanying drawings.

EXAMPLE

As shown in FIG. 1, a drill 10 includes a flute 20 and a shank 40 extending from the flute 20. The drill 10 is a sufficiently long cast hole drill.

Figure 2A:
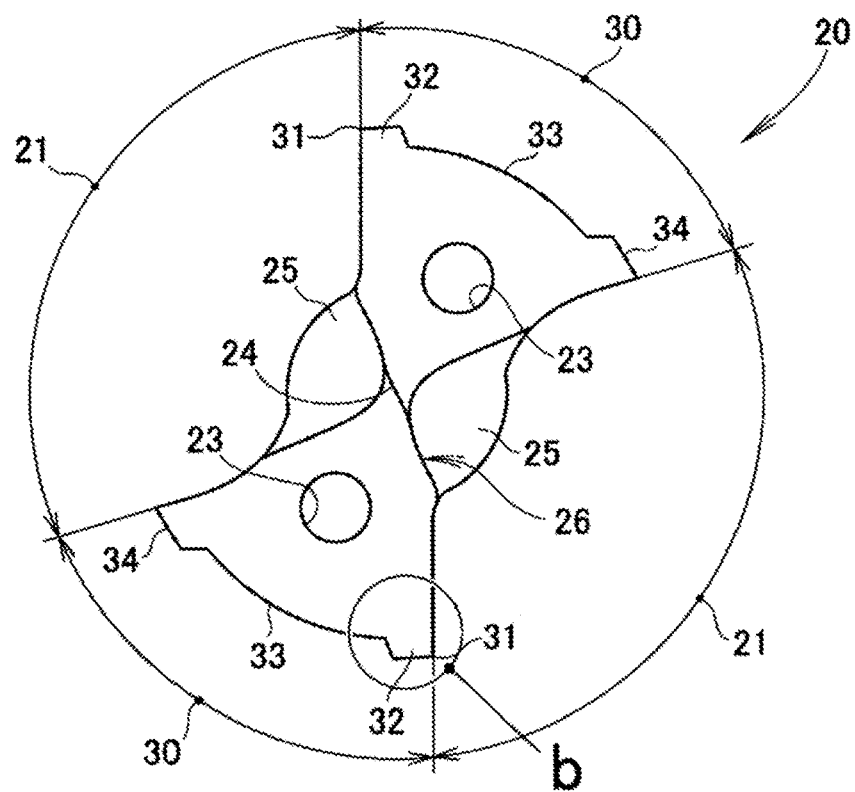
FIG. 2A is a front view of the drill.

As shown in FIG. 2A, in a front view, the flute 20 alternately has two lands 30, 30 and two grooves 21, 21. Further, the flute 20 has two oil holes 23, 23 and a linear chisel edge 24.

Figure 2B:
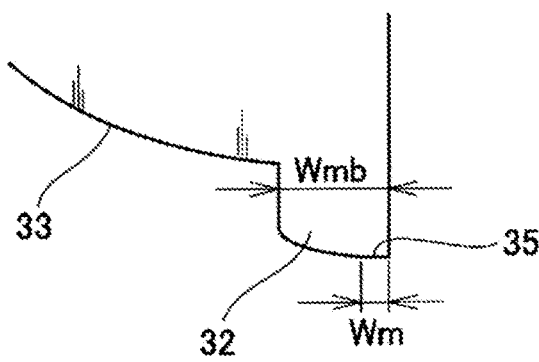
FIG. 2B is an enlarged view of "b" in FIG. 2A.

As shown in FIG. 2B which is an enlarged view of the portion b of FIG. 2A, a margin 35 having a width Wm is included in a margin portion 32 having a width Wmb.

More specifically, the land 30 is provided with a margin portion 32 continuous from the cutting edge 31, a clearance 33 continuous from the margin portion 32 and having a diameter smaller than that of the margin portion 32, and a pad 34 continuous from the clearance 33 and having a width (Wp in FIG. 3) the same as a width Wmb of the margin portion 32. Preferably, the rear end of the pad 34 is connected to the groove 21.

As shown in FIG. 3, the chisel edge 24 is formed with a narrow width by the two thinnings 25, 25. The thinning angle θ1 was set to 90°.

The larger the width Wm of the margin 35 is, the higher the straightness is. On the other hand, the cutting resistance increases. By setting the width Wm of the margin 35 to 0.1 to 0.15 mm, the cutting resistance is suppressed while maintaining straightness.

The pad 34 and the margin 35 are formed on the same circumference.

The smaller the width of the margin 35 (FIG. 2B, Wm), the lower the cutting resistance, but the lower the strength of the drill. By setting the width Wmb of the margin portion 32 to be 0.08 times the diameter of the drill 10, the reduction in strength of the drill is suppressed while maintaining straightness.

Therefore, by setting the width Wmb of the margin portion 32 and the width Wp of the pad 34 to be the same, it is possible to suppress the cutting resistance while maintaining straightness.

As shown in FIG. 4A, a ridge line which is a part of the cutting edge and formed by the clearance surface and the thinning 25 is defined as a thinning face 26. When lines 27 perpendicular to the thinning faces 26 are drawn in the front view, the pads 34 are arranged on the perpendicular lines 27.

As shown in FIG. 4B, the force indicated by the arrow (1) is applied to the thinning face 26 at the time of cutting. On the other hand, the force indicated by the outlined arrow (2) is applied when the pad 34 hits an inner circumferential surface of the cast hole. The two forces are canceled out, and occurrence of chatter vibration can be suppressed.

In FIG. 4A, the pad 34 is disposed at a position forming an angle θ2 of 30° to 75° with respect to the margin portion 32. The angle θ2 is preferably 50° to 70°, most preferably 65°.

By setting the angle θ2 appropriately, the straightness is enhanced and the cutting balance is improved.

Figure 5:
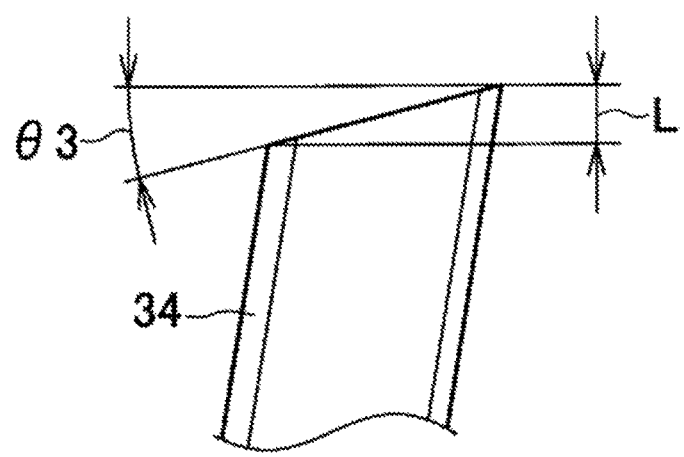
FIG. 5 is a view illustrative of a clearance angle.

In addition, as shown in FIG. 5, the clearance angle θ3, which is also called the relieving angle, is set to 6° to 8° in a side view. If the angle is within this range, the distance L between the chisel edge 24 and the tip of the pad 34 becomes small. When the distance L is small, the pad exerts its effect immediately after cutting. Owing to the pad, the position accuracy of the hole and the working accuracy on the surface of the hole can be further enhanced.

If the clearance angle θ3 is smaller than 6°, the cutting resistance becomes high and chatter vibration tends to occur. If the clearance angle θ3 is larger than 8°, the pad takes some time to be effective since the cutting process is started. In this case, chatter vibration immediately after the start of cutting cannot be suppressed, and the accuracy is not improved. Therefore, the clearance angle θ3 is set to 6° to 8°.

The drill of the present invention may be used for drilling to general parts in addition to the cast hole machining.

INDUSTRIAL APPLICABILITY

The drill of the present invention is suitable for machining a cast hole.

REFERENCE SIGNS LIST

10 . . . drill, 20 . . . flute, 21 . . . groove, 24 . . . chisel edge, 26 . . . thinning face, 27 . . . line perpendicular to thinning face, 30 . . . land, 31 . . . cutting edge, 32 . . . margin portion, 33 . . . clearance, 34 . . . pad, 35 . . . margin, 40 . . . shank, θ2 . . . angle of pad to margin, θ3 . . . clearance angle, Wm . . . margin width, Wmb . . . margin portion width, Wp . . . pad width

The invention claimed is:

1. A drill comprising:
   a flute with a cutting edge formed at a tip end thereof and a shank continuously formed at a rear end of the flute, wherein
   the flute has, in a front view, two lands and two grooves, alternately, and a linear chisel edge,
   the lands each have a margin portion continuous with the cutting edge, a clearance continuous with the margin portion and having a diameter smaller than that of the margin portion, and a pad continuous with the clearance and having a width equal to a width of the margin portion, and
   the pad is arranged, in a front view, on a line perpendicular to a thinning face and on a line perpendicular to the chisel edge.

2. The drill according to claim 1, wherein the margin portion includes a margin having a width smaller than the width of the pad.

3. The drill according to claim 1, wherein a relieving angle is set in a range of 6° to 8° in a side view.

4. The drill according to claim 1, wherein the pad is disposed at a position 30° to 75° rearward relative to the margin portion.

\* \* \* \* \*